United States Patent [19]

Bröken

[11] 4,399,997
[45] Aug. 23, 1983

[54] SEALING BUSH UNIT FOR SEALING RECIPROCATING MACHINE PARTS

[76] Inventor: Erich Bröken, Im Moddenfelde 24, D-4902 Bad Salzuflen 1, Fed. Rep. of Germany

[21] Appl. No.: 381,513

[22] Filed: May 24, 1982

[30] Foreign Application Priority Data

May 29, 1981 [DE] Fed. Rep. of Germany ....... 3121317

[51] Int. Cl.³ .................. F16J 15/48; F04B 21/08
[52] U.S. Cl. .................................. 277/12; 277/3; 277/27; 277/165; 92/165 R; 92/167; 92/168; 417/437
[58] Field of Search ....... 92/165 R, 165 PR, 166–168; 277/3, 27, 12, 32, 165; 417/437

[56] References Cited

U.S. PATENT DOCUMENTS

| 536,255 | 3/1895 | Baldwin | 92/165 R X |
| 2,145,854 | 2/1939 | Bijur | 92/165 R X |
| 2,910,007 | 10/1959 | Buri | 92/168 X |
| 3,019,739 | 2/1962 | Prosser | 277/3 X |
| 3,418,001 | 12/1968 | Rentschler et al. | 277/165 |
| 3,742,822 | 7/1973 | Talbert | 417/437 X |
| 4,020,910 | 5/1977 | Peterson et al. | 277/165 X |

FOREIGN PATENT DOCUMENTS

| 585362 | 10/1959 | Canada | 277/165 |
| 2328963 | 10/1976 | Fed. Rep. of Germany . | |

*Primary Examiner*—Robert S. Ward, Jr.
*Attorney, Agent, or Firm*—Michael J. Striker

[57] ABSTRACT

A sealing bush unit for sealing a reciprocating machine part has an annular bush with an inner diameter exceeding an outer diameter of the reciprocating pump to form a radial gap therebetween, a radially outer surface arranged so that a working pressure acts upon the same and the bush radially displaces towards the reciprocating part, one flat end face facing toward a suction zone and providing an abutment for the sealing bush, and another end face facing toward a pressure zone, wherein a pressing ring is arranged adjacent to the other end face of the bush with axial play relative to a machine housing.

15 Claims, 3 Drawing Figures

SEALING BUSH UNIT FOR SEALING RECIPROCATING MACHINE PARTS

BACKGROUND OF THE INVENTION

The present invention relates to a self-centering sealing bush unit for sealing reciprocating machine parts, particularly pistons of fluid-supplying pumps, as well as to a machine such as a fluid-supplying pump provided with such sealing bush.

Known sealing bush units include a sealing bush with an inner diameter which is greater than the outer diameter of a piston, whereby forming an annular sealing gap. Working pressure acts upon the rear side of the sealing bush opposite to the sealing gap over a part of its length, and the bush is radially movable relative to the piston. The sealing bush has a flat face extending normal to the piston axis and provided for axial abutment of the bush. One such sealing bush unit is disclosed in German Pat. No. 2,328,963. The sealing bush unit of this patent has a self-centering sealing bush which is axially pressed against an intermediate sealing disk with the aid of an axially acting spring. The intermediate sealing disk abuts with its spherical face against a relatively movable insert. The center of the sphere of the spherical face serving for abutment of the intermediate sealing disk lies in or adjacent to a center of the sealing bush. When the sealing bush unit is designed in accordance with the present invention, a contact-free self-centering of the sealing bush with a minimum of force consumption is attained. Because of the radially and angularly adjustable support of the intermediate sealing disk, the sealing bush corresponds to the movement of the reciprocating parts and can deform freely over its entire length. This construction is used in practice. For unobjectionable operation of the above-described sealing bush unit, it is, however, necessary to provide a spring device and an intermediate sealing disk having a spherical face. Moreover, this construction cannot be advantageously utilized when the pump is equipped with several pistons, inasmuch as the distances between the individual sealing bushes can be changed under the action of temperature.

SUMMARY OF THE INVENTION

Accordingly, it is an object of the present invention to provide a sealing bush unit with an operationally reliable sealing and a moving possibility in radial direction, which at the same time has a minimum of structural expenditures.

In keeping with these objects, and with others which will become apparent hereinafter, one feature of the present invention resides, briefly stated, in a sealing bush unit which has a sealing bush with an end face facing toward a pressure zone of the machine, and a pressing ring arranged at this end face with play in axial direction relative to a pump housing.

It is also another object of the present invention to provide a machine, such as a fluid-displacing pump, with a sealing bush unit designed as described immediately hereinabove.

Since the pressing ring is arranged with play in the axial direction relative to the pump housing, it is avoided that the sealing bush is tensioned in the axial direction.

In accordance with another advantageous feature of the present invention, the inner diameter of the pressing ring is greater than the inner diameter of the sealing bush. Thereby an unobjectionable movement of the piston is guaranteed.

Still another advantageous feature of the present invention is that a sealing member is arranged between the pressing ring and the pump housing.

A further feature of the present invention is that the pressing ring has a radially outer surface with a spherical shape.

Yet a further feature of the present invention is that the pressure ring has a seal-receiving recess provided on its outer surface.

The sealing member is arranged in the seal-receiving recess and is advantageously formed as a high-pressure sealing member.

The spherical construction of the outer surface of the pressing ring makes possible a spatial displacement of the sealing bush while maintaining an operationally reliable sealing between the pressing ring and the sealing bush.

In accordance with an additional feature of the present invention, the pressing ring can be arranged in a respectively formed recess of the pump housing.

Still a further feature of the present invention is that it is not excluded that in the axial gap between the pressing ring and the pump housing, spring means for obtaining a certain tensioning can be arranged.

It is also advantageously a feature of the present invention that the sealing bush has one flat end face facing toward the suction zone of the machine and extending normal to the bush axis, wherein this flat end face abuts directly against the pump housing.

An annular recess can be provided at this location of the pump housing and communicate with the suction zone of the machine via a passage.

Still another advantageous feature of the present invention is that the sealing bush has an extension which extends through and axially outwardly beyond the pressing ring. In this extended region, an outside load by pressure takes place, whereby with the respective construction the sealing gap can be narrowed.

When the sealing bush unit is designed in accordance with the present invention, the pressing ring and the sealing member provided on its outer surface are firmly pressed by the pressure medium during the pressure stroke. The sealing member, which is advantageously formed as a high-pressure sealing member, is tightly pressed during the pressure stroke in the seal-receiving recess and against the pump housing. During the suction stroke the deformed sealing bush is again displaced into its initial or normal position. The invention is particularly favorable for a construction having several pistons.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
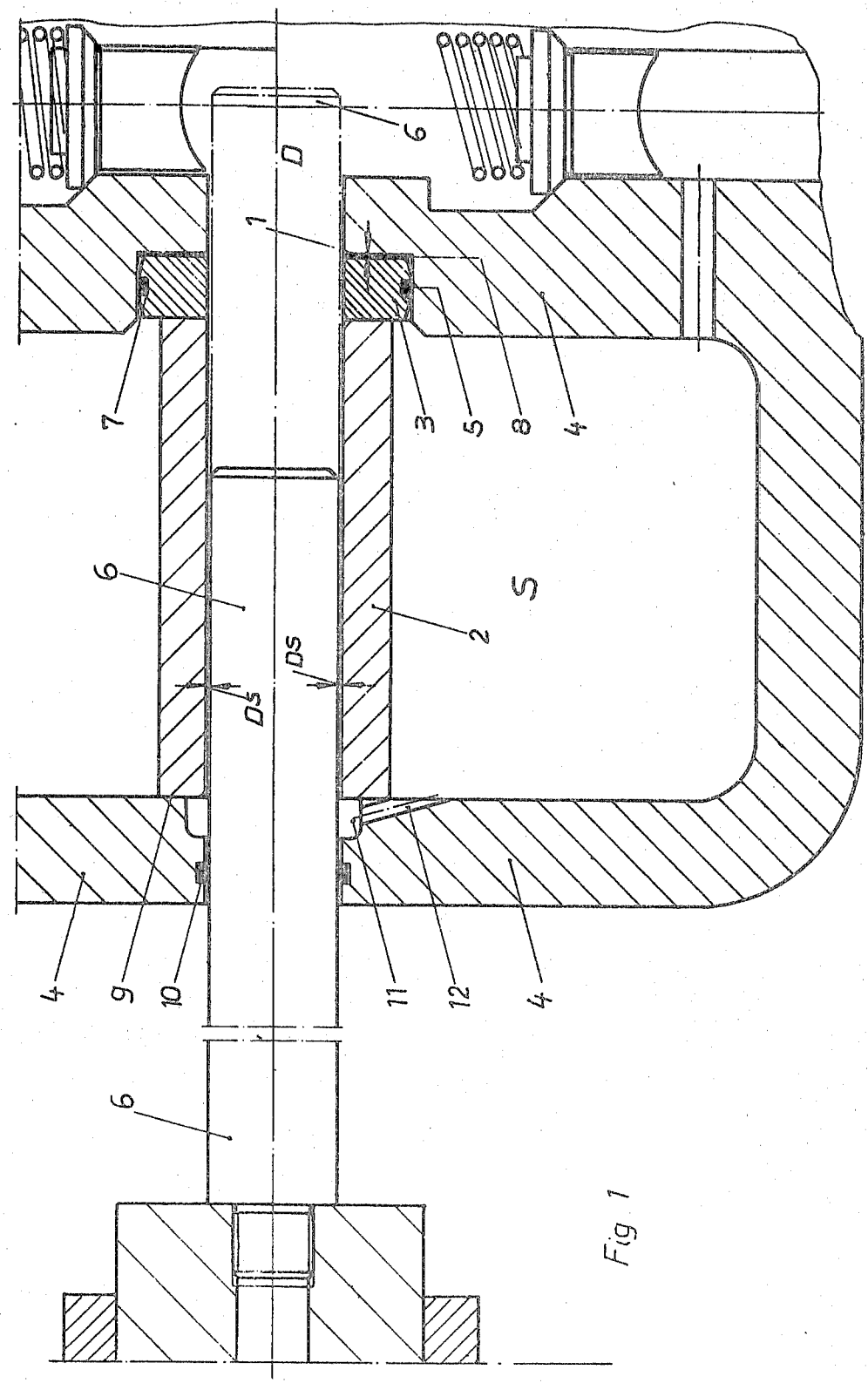
FIG. 1 is a section of a pump and a sealing bush unit in accordance with the present invention.
Figure 2:
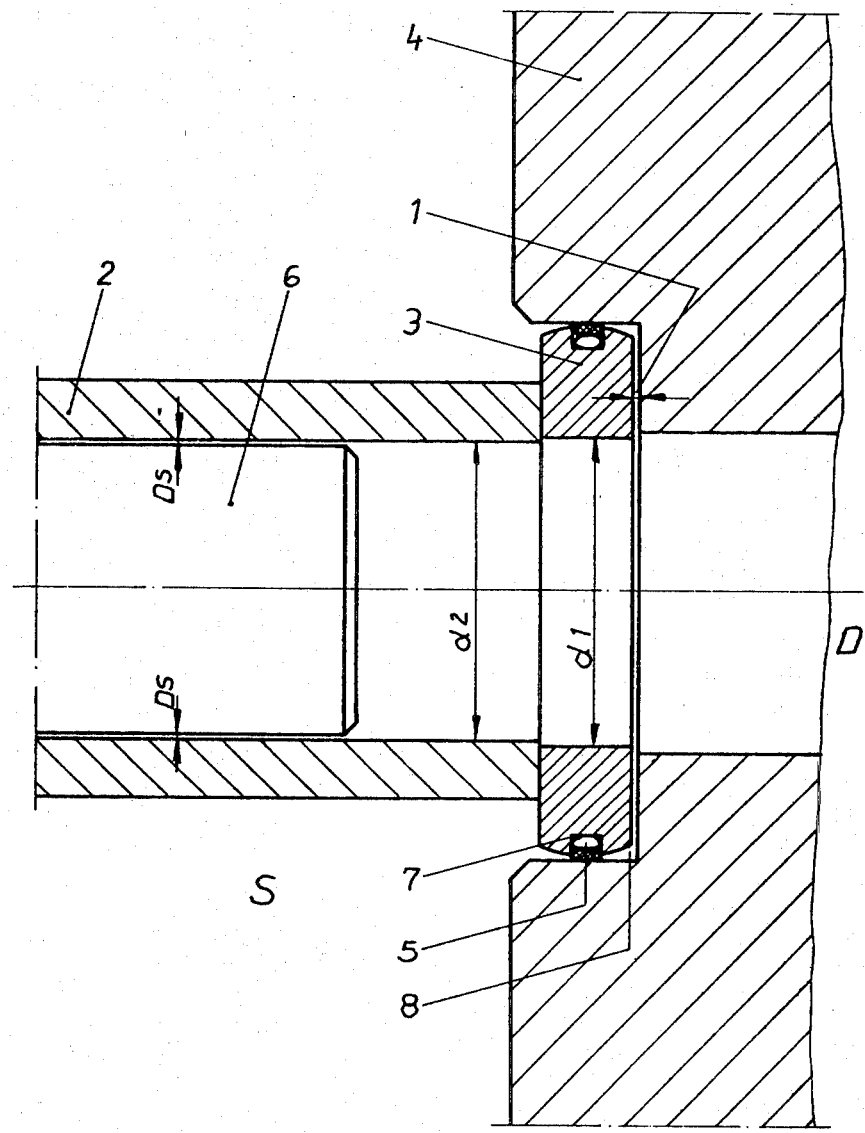
FIG. 2 is an enlarged sectional view of a pressing ring of the sealing bush unit in accordance with the present invention.

FIG. 1 shows a piston 6 located in an end position of its suction stroke. After performing the pressure stroke, the plunger assumes a position identified by broken lines.

A sealing bush unit in accordance with the present invention has an elastically deformable sealing bush 2 with an inner diameter which is greater than the outer diameter of the plunger 6. The sealing bush 2 has a flat face 9 located at a suction side S of the machine and abutting directly against a pump housing 4. The sealing bush 2 has another end face located at a pressure side D of the machine. A pressing ring 3 is arranged adjacent to the other end side of the sealing bush.

The pressing ring 3 is received in a respectively shaped recess 8 of the pump housing 4 with a play 1 in the axial direction of the pump housing 4. The inner diameter $d_1$ of the pressing ring 3 is greater than the inner diameter $d_2$ of the sealing bush 2. In order to guarantee free displacement of the sealing bush 2, the pressing ring 3 has an outer surface with a spherical shape.

A seal-receiving recess 7 is provided in the outer surface of the pressing ring 3, and sealing member 5 is inserted in the recess 7. The inserted sealing member 5 is advantageously formed as a high-pressure sealing member. During suction stroke, the pressing ring 3 is firmly pressed by the pressure medium against the sealing bush 2, whereby an operationally reliable sealing between the pressure side D and the suction side S of the machine is provided. Moreover, the sealing 5 is firmly pressed into the seal-receiving recess 7 and against the pump housing 4. A low-pressure sealing member is further provided and identified by reference numeral 10.

The pump housing 4 has an annular recess 11 provided in the part thereof against which the flat end face 9 of the sealing bush 2 abuts. The annular recess 11 communicates with a suction side S of the pump via a passage 12. Thereby the drag stream produced in an annular gap DC between the piston 6 and the sealing bush 2 is equalized toward the suction side S.

Figure 3:
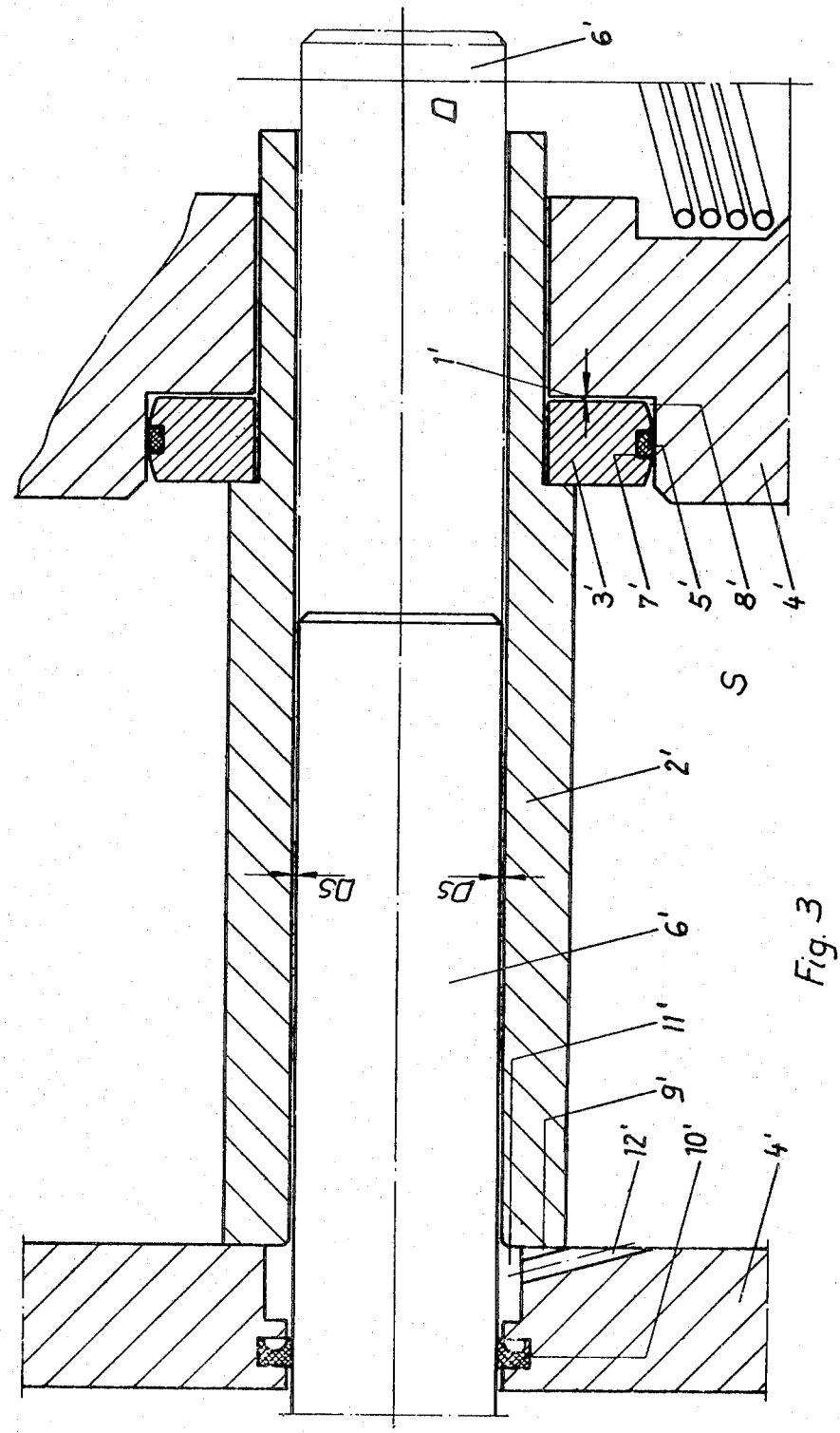
FIG. 3 is an enlarged view of a sealing bush unit in accordance with another embodiment of the present invention.

FIG. 3 shows a sealing bush unit in accordance with a further embodiment of the invention. A sealing bush 2' of this embodiment has a portion extending inwardly through a pressing ring 3' and axially outwardly beyond the latter. One end face of the pressing ring is arranged with a play 1' relative to the housing 4', similarly to the first embodiment of the invention. The other end face of the pressing ring 3' abuts against a shoulder formed between the above-mentioned extended portion and a remaining part of the sealing bush 2'.

It will be understood that each of the elements described above, or two or more together, may also find a useful application in other types of constructions differing from the types described above.

While the invention has been illustrated and described as embodied in a sealing bush unit and a pump provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sealing bush unit for sealing a reciprocating machine part, particularly a plunger of a fluid-displacing pump having a pump housing with suction and pressure sides, the sealing bush unit comprising an annular bush having an axis, a radially inner surface with an inner diameter exceeding an outer diameter of a plunger so as to form a radial gap therebetween, a radially outer surface arranged so that a working pressure acts upon said radially outer surface over a part of its axial length and thereby said bush radially displaces toward the plunger, and two end faces of which one end face faces toward a suction zone and the other end face faces toward a pressure zone, said one end face being flat and extending normal to said axis of said bush to provide axial abutment of the latter; and a pressing ring arranged adjacent to the other end face of said bush with an axial play relative to the pump housing.

2. A sealing ring unit as defined in claim 1, wherein said pressing ring has an inner diameter which is greater than said inner diameter of said inner surface of said bush.

3. A sealing bush unit as defined in claim 1; and further comprising a sealing member arranged between said pressing ring and the pump housing.

4. A sealing bush unit as defined in claim 1, wherein said pressing ring has a radially outer surface having a spherical shape.

5. A sealing bush unit as defined in claim 1, wherein said pressing ring has a radially outer surface provided with a seal-receiving recess.

6. A sealing bush unit as defined in claim 1, wherein the housing has a recess; and further comprising a sealing member arranged in said recess of said housing.

7. A sealing bush unit as defined in claim 5; and further comprising a sealing member arranged in said seal-receiving recess of said pressing ring.

8. A sealing bush unit as defined in claim 7, wherein said sealing member is formed as a high-pressure sealing member.

9. A sealing bush unit as defined in claim 1, wherein the housing has a further recess, said pressing ring being received in said further recess of said housing.

10. A sealing bush unit as defined in claim 1; and further comprising spring means arranged between said pressing ring and the housing in said axial play.

11. A sealing bush unit as defined in claim 1, wherein said one end face of said bush is formed as a flat face extending normal to said axis of said bush.

12. A sealing bush unit as defined in claim 11, wherein said one end face of said bush is arranged to directly abut against the housing.

13. A sealing bush unit as defined in claim 1, wherein said bush has an extension which extends through and axially beyond said pressing ring.

14. A sealing bush unit as defined in claim 1, wherein the housing has a part facing toward said one end face of said bush and having an annular recess and a passage communicating the latter with the suction zone.

15. A machine, particularly a fluid-displacing pump, comprising a pump housing with suction and pressure zones;

a plunger reciprocating in said pump housing and having a predetermined outer diameter;

an annular sealing bush having an axis, a radially inner surface with an inner diameter exceeding the outer diameter of a plunger so as to form a radial gap therebetween, a radially outer surface arranged so that a working pressure acts upon said radially outer surface over a part of its axial length and thereby said bush radially displaces toward said plunger, and two end faces of which one end face faces toward a suction zone and the other end face faces toward a pressure zone, said one end face being flat and extending normal to said axis of said bush to provide axial abutment of the latter; and a pressing ring arranged adjacent to the other end face of said bush with an axial play relative to said pump housing.

* * * * *

UNITED STATES PATENT AND TRADEMARK OFFICE
CERTIFICATE OF CORRECTION

PATENT NO. : 4 399 997
DATED : August 23, 1983
INVENTOR(S) : Erich Bröker

It is certified that error appears in the above—identified patent and that said Letters Patent is hereby corrected as shown below:

On the title page:
In the heading [76], the name of the applicant should read:

--Erich Bröker--

Signed and Sealed this

Twenty-first Day of May 1985

[SEAL]

Attest:

DONALD J. QUIGG

Attesting Officer

Acting Commissioner of Patents and Trademarks